O. STOLP.
GATE.
APPLICATION FILED JAN. 24, 1918.
1,367,928. Patented Feb. 8, 1921.
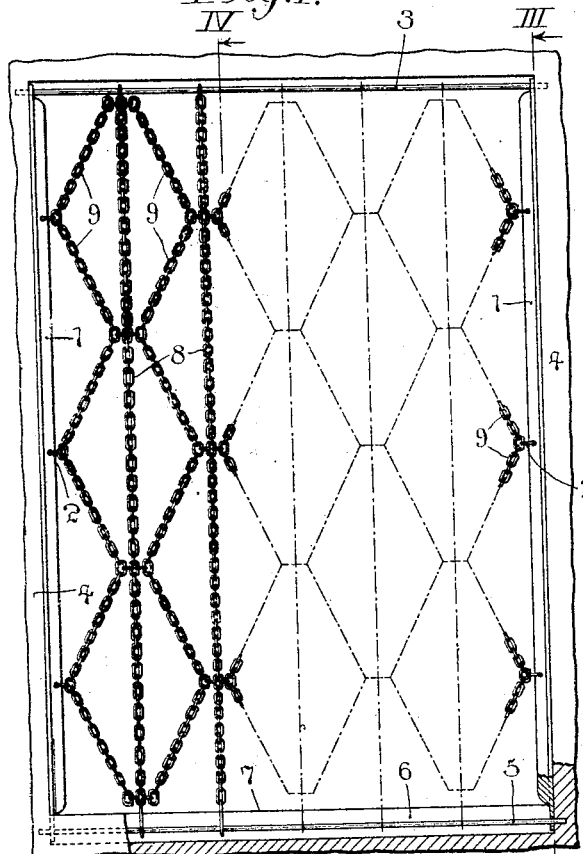
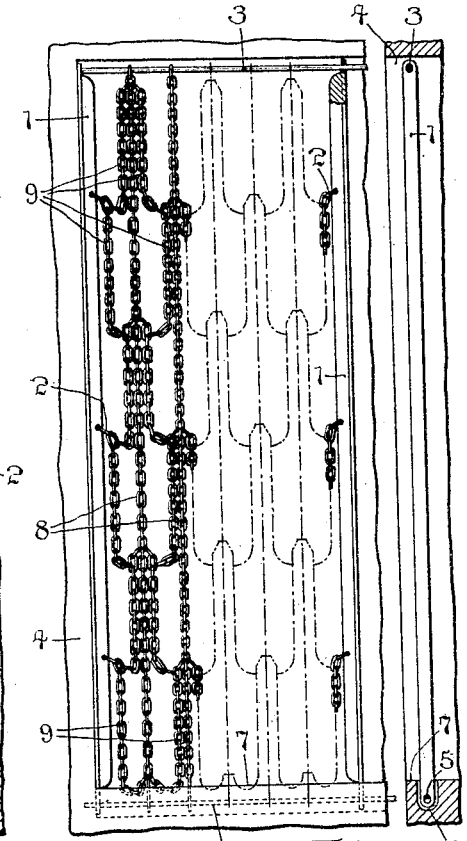
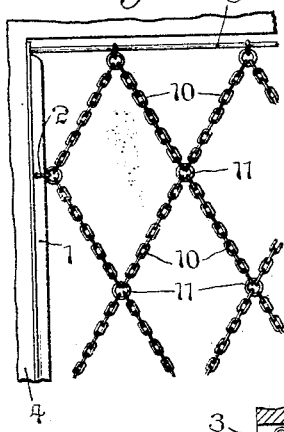
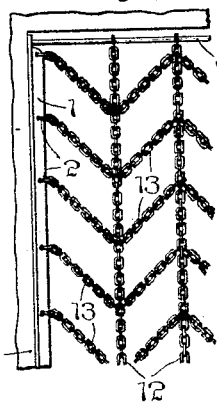
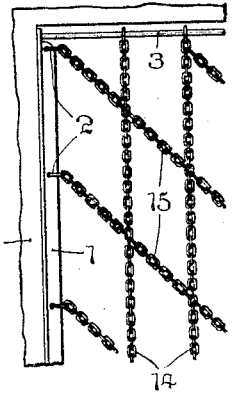
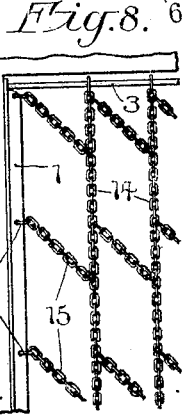
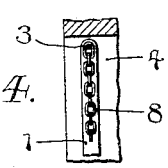
Inventor:
Oscar Stolp
by attorneys

UNITED STATES PATENT OFFICE.

OSCAR STOLP, OF NEW YORK, N. Y.

GATE.

1,367,928.   Specification of Letters Patent.   Patented Feb. 8, 1921.

Application filed January 24, 1918. Serial No. 213,542.

*To all whom it may concern:*

Be it known that I, OSCAR STOLP, a citizen of the United States, and resident of the borough of Manhattan, in the city and State of New York, have invented a new and useful Improvement in Gates, of which the following is a specification.

This invention relates to improvements in gates and more particularly to a collapsible gate, the body of which is flexible, to a considerable degree, and controlled in its opening and closing movements by its side supports.

My invention comprises a collapsible gate formed of lengths of chain linked together.

A practical embodiment of my invention is represented in the accompanying drawings, in which—

Figure 1 represents a front elevation of an opening having my improved gate applied thereto in an extended position.

Fig. 2 represents a view of the same in a partially collapsed position,

Fig. 3 represents a vertical section taken in the plane of the line III—III of Fig. 1, looking in the direction of the arrows, Fig. 4 represents a detail vertical section taken in the plane of the line IV of Fig. 1, looking in the direction of the arrow, and Figs. 5, 6, 7 and 8 are detail elevations of several forms in which the lengths of chain may be linked together to form the body.

My improved gate is particularly applicable to openings in automobile trucks, wagons, railroad cars, or other vehicles where articles to be carried or stored are of irregular shape and roughly handled and where certain flexibility and strength are required to retain the articles in position.

The gate comprises one or more vertical spreaders 1 and lengths of chain linked together at intervals and connected to the spreaders at 2. The spreaders and chain are supported in sliding engagement on a rod or bar 3 mounted in the side walls 4 of a truck or other vehicle.

In order to maintain the gate in a vertical position and prevent the displacement of the lower part of the gate, I provide a rod or bar 5 located in a channel 6 in the floor 7 of the truck, on which rod the lower end of the spreaders and chains are arranged to slide. I do not deem this lower rod 5 as essential toward the successful working of the gate, but only to guard against unintentional displacement of the chain portion between the spreaders and it is obvious that other means of securing the ends of the chain may be installed without departing from the spirit and scope of my invention.

The spreaders 1 may be removably secured to the walls 4 by any well known and approved means or one of the spreaders may be permanently fastened to the wall.

In the form shown in Figs. 1 to 4 inclusive, the lengths of chain are arranged in series having vertical lengths of chain 8 extending from the upper rod 3 to the lower rod 5, and lengths of chain 9 arranged in criss-cross fashion intermediate of the vertical lengths of chain 8.

In the form shown in Fig. 5, the lengths of chain 10 are arranged diagonally across the opening and connected at each point of intersection to links 11.

In the forms shown in Fig. 6, the vertical lengths of chain 12 have interposed therebetween lengths of chain 13 arranged in zigzag fashion horizontally across the opening.

In the form shown in Figs. 7 and 8, the vertical lengths of chain 14 have short lengths of chain 15 interposed obliquely therebetween. In some instances, where the opening is very wide, or where a gate is required to be extended or collapsed for only a part of the distance across the opening, I may insert intermediate spreaders which will serve to maintain the gate in extended position and manipulated in sections.

To collapse the gate, one of the spreaders is moved toward the other spreader, which movement will cause the tension on the lengths of chain to be relaxed, and, by gravity, assume the position shown in Fig. 2. The intermediate links, engaging the upper and lower rods will be slid along the rods as they come into contact with each other until they are massed against the stationary spreader, when the gate will be completely collapsed. To extend the gate the movable spreader is moved on the bars 3 and 5 across the opening in which movement the spreader will draw out the lengths of chain until it reaches the wall of the opening.

By this device, a large opening may be securely guarded and when collapsed will occupy a minimum amount of space.

What I claim is:—

1. A collapsible gate comprising a horizontally disposed rod, vertical lengths of chain suspended from and mounted to slide on said rod, and lengths of chain interposed diagonally between and connecting the vertical lengths of chain.

2. A collapsible gate comprising a horizontally disposed rod, vertical spreaders, vertical lengths of chain interposed between said spreaders, said spreaders and chain being suspended from and mounted to slide on said rod, and lengths of chain interposed diagonally between and connecting the vertical lengths of chain and the spreaders.

3. A collapsible gate comprising upper and lower horizontally disposed rods, vertical lengths of chain suspended from said upper rod and mounted to slide on said upper and lower rods, and lengths of chain interposed diagonally between and connecting the vertical lengths of chain.

4. A collapsible gate comprising upper and lower horizontally disposed rods, vertical spreaders mounted to slide on said rods, vertical lengths of chain interposed between said spreaders suspended from the upper rod and mounted to slide on the upper and lower rods, and lengths of chain interposed diagonally between and connecting the vertical lengths of chain and spreaders.

In testimony, that I claim the foregoing as my invention, I have signed my name this 20th day of December, 1917.

OSCAR STOLP.